(12) United States Patent
Takahashi et al.

(10) Patent No.: US 10,559,823 B2
(45) Date of Patent: Feb. 11, 2020

(54) MANGANESE NICKEL COMPOSITE HYDROXIDE AND METHOD FOR PRODUCING SAME, LITHIUM MANGANESE NICKEL COMPOSITE OXIDE AND METHOD FOR PRODUCING SAME, AND NONAQUEOUS ELECTROLYTE SECONDARY BATTERY

(71) Applicant: SUMITOMO METAL MINING CO., LTD., Tokyo (JP)

(72) Inventors: Tatsuya Takahashi, Niihama (JP); Masashi Iwara, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 58 days.

(21) Appl. No.: 15/753,175

(22) PCT Filed: Aug. 22, 2016

(86) PCT No.: PCT/JP2016/074399
§ 371 (c)(1),
(2) Date: Feb. 16, 2018

(87) PCT Pub. No.: WO2017/033895
PCT Pub. Date: Mar. 2, 2017

(65) Prior Publication Data
US 2018/0205079 A1    Jul. 19, 2018

(30) Foreign Application Priority Data
Aug. 24, 2015 (JP) ................. 2015-165247

(51) Int. Cl.
*H01M 4/505* (2010.01)
*H01M 4/525* (2010.01)
(Continued)

(52) U.S. Cl.
CPC .......... *H01M 4/505* (2013.01); *C01G 53/006* (2013.01); *C01G 53/54* (2013.01); *H01M 4/525* (2013.01);
(Continued)

(58) Field of Classification Search
None
See application file for complete search history.

(56) References Cited

U.S. PATENT DOCUMENTS

2003/0044684 A1* 3/2003 Nanamoto ............ H01M 4/133
429/231.1
2013/0092625 A1 4/2013 Tachifuji
(Continued)

FOREIGN PATENT DOCUMENTS

CN    102034967 A    4/2011
JP    2000-306577 A    11/2000
(Continued)

OTHER PUBLICATIONS

Office Action dated Feb. 3, 2019, issued in the CN Patent Application No. CN201680048773.4.
(Continued)

*Primary Examiner* — Maria Laios
(74) *Attorney, Agent, or Firm* — Locke Lord LLP

(57) ABSTRACT

A manganese nickel composite hydroxide which serves as a starting material for positive electrode active materials for secondary batteries, and the secondary battery having low resistance and high output characteristics. A manganese nickel composite hydroxide according to the present invention is represented by general formula (A) $Mn_{1-x-y}Ni_xM_y(OH)_{2+\alpha}$ (wherein $0 \leq x \leq 0.27$, $0 \leq y \leq 0.05$, $0 \leq \alpha \leq 0.5$, and M represents at least one element selected from among Mg, Al, Ca, Ba, Sr, Ti, V, Fe, Cr, Co, Cu, Zr, Nb, Mo and W), and has an $SO_4$ content of 0.90% by weight or less, an Na
(Continued)

content of 0.04% by weight or less, a BET specific surface area of from 40 m²/g to 70 m²/g (inclusive), and a value obtained by [($d_{90}$-$d_{10}$)/(average particle diameter)] of 0.90 or less, said value being an index indicating the expanse of the particle size distribution.

8 Claims, 8 Drawing Sheets

(51) Int. Cl.
    *C01G 53/00*     (2006.01)
    *H01M 10/052*     (2010.01)
    *C01G 45/00*     (2006.01)
    *H01M 10/0525*     (2010.01)
    *H01M 4/02*     (2006.01)

(52) U.S. Cl.
    CPC ........ *C01G 45/006* (2013.01); *C01P 2002/32* (2013.01); *C01P 2004/03* (2013.01); *C01P 2004/51* (2013.01); *C01P 2004/54* (2013.01); *C01P 2004/61* (2013.01); *C01P 2006/12* (2013.01); *C01P 2006/40* (2013.01); *C01P 2006/80* (2013.01); *H01M 10/052* (2013.01); *H01M 10/0525* (2013.01); *H01M 2004/028* (2013.01); *H01M 2220/30* (2013.01)

(56) References Cited

U.S. PATENT DOCUMENTS

2014/0356712 A1* 12/2014 Song .................... H01M 4/131
    429/219
2016/0156033 A1* 6/2016 Fujii ................. H01M 10/0525
    429/223

FOREIGN PATENT DOCUMENTS

| | | | |
|---|---|---|---|
| JP | 2001-273898 | A | 10/2001 |
| JP | 2004-210560 | A | 7/2004 |
| JP | 2006-117517 | A | 5/2006 |
| JP | 2011-116583 | A | 6/2011 |
| JP | 2012-234833 | A | 11/2012 |
| JP | 2012234833 | A * | 11/2012 |
| JP | 2013-237951 | A | 11/2013 |
| JP | 2015-118801 | A | 6/2015 |
| JP | 2015-140297 | A | 8/2015 |
| WO | 2011/158675 | A1 | 12/2011 |
| WO | WO-2015008863 | A1 * | 1/2015 ............. C01G 53/00 |

OTHER PUBLICATIONS

International Search Report dated Sep. 20, 2016, issued for PCT/JP2016/074399.

* cited by examiner

MANGANESE NICKEL COMPOSITE HYDROXIDE AND METHOD FOR PRODUCING SAME, LITHIUM MANGANESE NICKEL COMPOSITE OXIDE AND METHOD FOR PRODUCING SAME, AND NONAQUEOUS ELECTROLYTE SECONDARY BATTERY

TECHNICAL FIELD

The present invention relates to a manganese-nickel complex hydroxide and a method for manufacturing the same, a nonaqueous electrolyte secondary battery positive electrode active material obtained by using the manganese-nickel complex hydroxide as a precursor and a method for manufacturing the same, and a nonaqueous electrolyte secondary battery using the positive electrode active material.

BACKGROUND ART

In recent years, there is an increasing demand for small and lightweight secondary batteries having a high energy density along with the spread of portable devices such as cellular phones and laptop personal computers. As such a secondary battery, there is a nonaqueous electrolytic solution type lithium ion secondary battery, the research and development thereof has been actively carried out, and it has been attempted to put the battery to practical use. Such a lithium ion secondary battery includes a positive electrode containing a lithium-containing complex oxide as an active material, a negative electrode containing a material capable of occluding and releasing lithium such as lithium, a lithium alloy, a metal oxide, or carbon as an active material, and a separator containing a nonaqueous electrolytic solution or a solid electrolyte as main constituents.

Examples of the material to be investigated as a positive electrode active material among these main constituents may include lithium-cobalt complex oxide ($LiCoO_2$), lithium-nickel complex oxide ($LiNiO_2$), and lithium-manganese complex oxide ($LiMn_2O_4$). In particular, a great number of batteries using lithium-cobalt complex oxide in the positive electrode have been so far developed to obtain excellent initial capacity characteristics and cycle characteristics, various results have already been obtained, and the batteries have been put to practical use.

Meanwhile, recently, the application fields of lithium-ion secondary batteries include a number of different fields from portable devices to vehicle applications such as hybrid vehicles and electric vehicles, and the characteristics required to secondary batteries have changed. In particular, a higher energy density of the battery is required in the vehicle applications described above. Hence, it has been investigated to use a positive electrode active material having a high potential, and among these, lithium-manganese-nickel complex oxide which stably expresses a high voltage of about 4.75 V in terms of metal lithium potential has attracted attention.

However, lithium-manganese-nickel complex oxide has not yet been put to practical use as a positive electrode active material at the present time. One reason for this is that lithium-manganese-nickel complex oxide has a high resistance. In addition, a highly resistive nonconductor film is formed on the surface of lithium-manganese-nickel complex oxide, and this leads to an increase in internal resistance and deterioration in battery characteristics, and further, it is also concerned that a decrease in safety is caused.

One of the factors of the formation of nonconductor film is the presence of impurities contained in manganese-nickel complex hydroxide which is a starting material for lithium-manganese-nickel complex oxide. In other words, when preparing lithium-manganese-nickel complex oxide by calcining manganese-nickel complex hydroxide and a lithium compound of a lithium source, a sulfate salt such as electrically inactive lithium sulfate and the like are formed on the surface layer of the positive electrode active material as a nonconductor film as the sulfate radical ($SO_4$) and the like of impurities in the manganese-nickel complex hydroxide react with the lithium compound, and an increase in internal resistance and deterioration in battery characteristics are thus caused.

In order to cope with such a problem, for example, Patent Document 1 proposes a technique to decrease the sulfate radical by washing the synthesized lithium transition metal complex oxide with water. However, in such a method, the washing step is further required and the cost increases as the steps increase. In addition, it is concerned that the battery capacity decreases since lithium is eluted together with the sulfate radical at the time of water washing.

In addition, Patent Document 2 discloses a method for suppressing mixing of the sulfate radical into the oxide by using a manganese compound having a small content of sulfate radical as a starting material at the time of the synthesis of lithium-manganese oxide. However, it is concerned that the kiln is damaged by chlorine generated at the time of the calcination and synthesis, for example, when a chloride salt, which is a representative example of a metal salt other than a sulfate salt, is used. In addition, sulfate salts such as manganese sulfate are inexpensive as compared to salts of other anions and it is thus disadvantageous not to use a sulfate salt as a starting material from the viewpoint of cost.

Meanwhile, Patent Document 3 discloses the use of manganese-nickel complex hydroxide having a molar ratio of manganese:nickel of 1:1 for the characteristic improvement of battery performance. In this patent document 3, the average particle diameter of the particles, the specific surface area thereof, the sulfate radical contained therein, and the peak intensity ratio obtained from the X-ray diffraction spectrum thereof are described. However, the particle size distribution of the particles is not described. The expanse of particle size distribution of the hydroxide particles of a starting material is a significantly important characteristic when producing lithium-manganese-nickel complex oxide from a complex hydroxide, and specifically, it affects the occurrence of abnormal aggregation and the like of lithium-manganese-nickel complex oxide to be obtained. Moreover, such abnormal aggregation leads to an increase in resistance of the battery formed to contain the lithium-manganese-nickel complex oxide as a positive electrode active material.

As described above, the expanse of particle size distribution of the hydroxide particles of a starting material is a significantly important characteristic in the production of lithium-manganese-nickel complex oxide, and the method of Patent Document 3 alone is not sufficient in order to achieve a secondary battery having higher performance.

As described above, manganese-nickel complex hydroxide having a small content of impurities and controlled particle size distribution, and lithium-manganese-nickel complex oxide obtained by using the manganese-nickel complex hydroxide as a starting material have been desired.

Patent Document 1: Japanese Unexamined Patent Application, Publication No. 2001-273898

Patent Document 2: Japanese Unexamined Patent Application, Publication No. 2000-306577
Patent Document 3: Japanese Unexamined Patent Application, Publication No. 2004-210560

DISCLOSURE OF THE INVENTION

Problems to be Solved by the Invention

In view of such problems, an object of the present invention is to provide manganese-nickel complex hydroxide which serves as a starting material for positive electrode active materials for secondary batteries and enables the achievement of an excellent secondary battery having a low resistance and high output characteristics.

Means for Solving the Problems

The present inventors have intensively investigated to achieve the above-mentioned object. As a result, it has been found out that the content of $SO_4$ as an impurity is easily decreased without newly adding a step and manganese-nickel complex hydroxide having narrow particle size distribution is obtained by using an alkali mixed aqueous solution in which sodium carbonate is added to sodium hydroxide as an alkali aqueous solution for adjustment of pH when sulfate salts are used as starting materials for a manganese source and a nickel source in the synthesis of manganese-nickel complex hydroxide. In addition, it has been found out that, according to manganese-nickel complex hydroxide obtained by using a sulfate salt as a starting material, it is possible to improve the reactivity of the manganese-nickel complex hydroxide with a lithium compound in the synthesis of lithium-manganese-nickel complex oxide.

(1) The present invention is manganese-nickel complex hydroxide which is represented by general formula (A): $Mn_{1-x-y}Ni_xM_y(OH)_{2+\alpha}$ ($0 \leq x \leq 0.27$, $0 \leq y \leq 0.5$, $0 \leq \alpha \leq 0.5$, and M is at least one element selected from among Mg, Al, Ca, Ba, Sr, Ti, V, Fe, Cr, Co, Cu, Zr, Nb, Mo, and W) and in which a $SO_4$ content is 0.90% by weight or less and a Na content is 0.04% by weight or less, a BET specific surface area is 40 $m^2/g$ or more and 70 $m^2/g$ or less, and a value which is an index indicating the expanse of particle size distribution and is determined by $[(d_{90}-d_{10})/\text{average particle diameter}]$ is 0.90 or less.

(2) The present invention is manganese-nickel complex hydroxide according to (1), in which a $SO_4$ content is 0.60% by weight or less.

(3) The present invention is lithium-manganese-nickel complex oxide which is represented by general formula (B): $Li_tMn_{2(1-x-y)}Ni_{2x}M_{2y}O_4$ ($0.96 \leq t \leq 1.20$, $0.20 \leq x \leq 0.28$, $0 \leq y \leq 0.05$, and M is at least one element selected from among Mg, Al, Ca, Ba, Sr, Ti, V, Fe, Cr, Co, Cu, Zr, Nb, Mo, and W) and has a cubic crystal structure composed of a spinel structure and in which a $SO_4$ content is 0.90% by weight or less and a Na content is 0.04% by weight or less.

(4) The present invention is the lithium-manganese-nickel complex oxide according to (3), in which a $SO_4$ content is 0.60% by weight or less.

(5) The present invention is a method for manufacturing manganese-nickel hydroxide, which includes mixing a solution containing sulfate salts to be used as a manganese source and a nickel source and an alkali mixed aqueous solution which contains sodium hydroxide and sodium carbonate, is obtained by adding sodium carbonate to a sodium hydroxide solution so that a ratio of the number of moles of sodium derived from sodium carbonate to the number of moles of entire sodium is 20% or less, and is used as an alkali aqueous solution and depositing a hydroxide by reactive crystallization.

(6) The present invention is a method for manufacturing lithium-manganese-nickel complex oxide, which includes a step of mixing a solution containing sulfate salts as a manganese source and a nickel source and an alkali mixed aqueous solution which contains sodium hydroxide and sodium carbonate and is obtained by adding sodium carbonate to a sodium hydroxide solution so that a ratio of the number of moles of sodium derived from sodium carbonate to the number of moles of entire sodium is 20% or less and depositing manganese-nickel hydroxide by reactive crystallization and a step of mixing and calcining the manganese-nickel complex hydroxide obtained and a lithium compound.

(7) The present invention is a method for manufacturing lithium-manganese-nickel complex oxide, which includes mixing and calcining manganese-nickel complex hydroxide and a lithium compound to obtain lithium-manganese-nickel complex oxide and in which the manganese-nickel complex hydroxide is represented by general formula (A): $Mn_{1-x-y}Ni_xM_y(OH)_{2+\alpha}$ ($0 \leq x \leq 0.27$, $0 \leq y \leq 0.05$, $0 \leq \alpha \leq 0.5$, and M is at least one element selected from among Mg, Al, Ca, Ba, Sr, Ti, V, Fe, Cr, Co, Cu, Zr, Nb, Mo, and W) and has a $SO_4$ content of 0.90% by weight or less and a Na content of 0.04% by weight or less, a BET specific surface area of 40 $m^2/g$ or more and 70 $m^2/g$ or less, and a value which is an index indicating the expanse of particle size distribution and is determined by $[(d_{90}-d_{10})/\text{average particle diameter}]$ of 0.90 or less.

(8) The present invention is a nonaqueous electrolyte secondary battery which includes a positive electrode, a negative electrode, a separator, and a nonaqueous electrolyte and in which a positive electrode material for the positive electrode contains the lithium-manganese-nickel complex oxide according to (3).

Effects of the Invention

The manganese-nickel complex hydroxide according to the present invention has excellent reactivity with a lithium compound, a low content of $SO_4$ of an impurity, and narrow particle size distribution. The lithium-manganese-nickel complex oxide obtained by mixing and calcining the manganese-nickel complex hydroxide and a lithium compound also has a low $SO_4$ content, a secondary battery having excellent characteristics such as a low resistance and a high output is obtained in the case of using this lithium-manganese-nickel complex oxide as a positive electrode active material.

PREFERRED MODE FOR CARRYING OUT THE INVENTION

Figure 1:
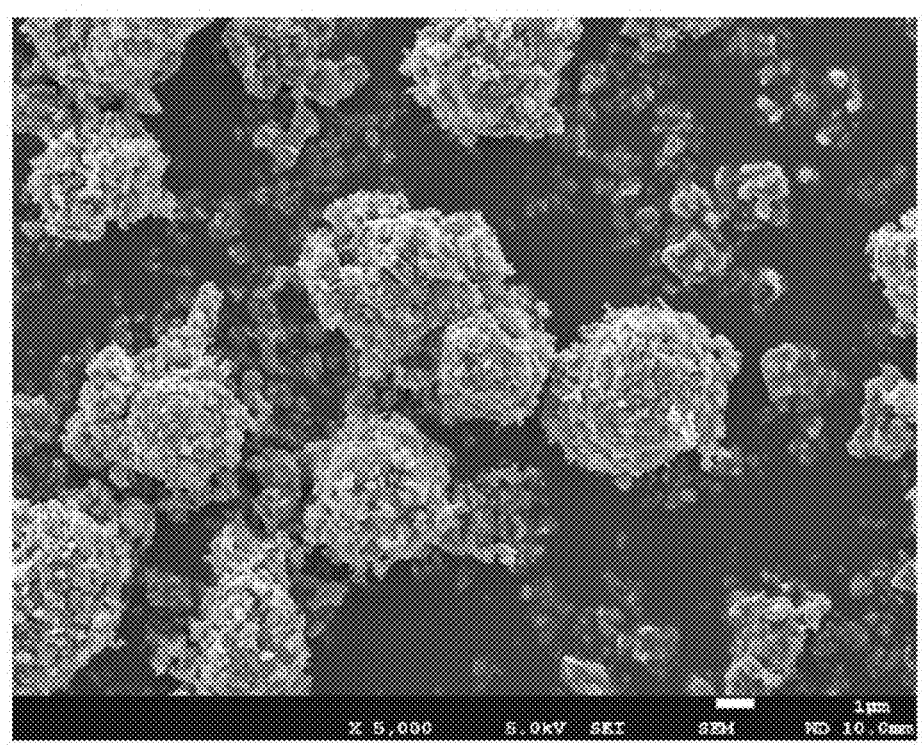
FIG. 1 is an SEM photograph illustrating the shape of particles of manganese-nickel complex hydroxide according to the present invention.

Hereinafter, embodiments (hereinafter referred to as the "present embodiment") of the present invention will be described in detail in the following order. Incidentally, the present invention is not limited to the following embodiments and various modifications are possible without changing the gist of the present invention.
1. Manganese-Nickel Complex Hydroxide
2. Method for Manufacturing Manganese-Nickel Complex Hydroxide
3. Lithium-Manganese-Nickel Complex Oxide
4. Method for Manufacturing Lithium-Manganese-Nickel Complex Oxide
5. Nonaqueous Electrolyte Secondary Battery Using Positive Electrode Active Material «1. Manganese-Nickel Complex Hydroxide»
(1) Composition The manganese-nickel complex hydroxide (hereinafter also simply referred to as the "complex hydroxide") according to the present embodiment is manganese-nickel complex hydroxide represented by general formula (A): $Mn_{1-x-y}Ni_xM_y(OH)_{2+\alpha}$ ($0 \leq x \leq 0.27$, $0 \leq y \leq 0.05$, $0 \leq \alpha \leq 0.5$, and M is at least one element selected from among Mg, Al, Ca, Ba, Sr, Ti, V, Fe, Cr, Co, Cu, Zr, Nb, Mo, and W).

Nickel (Ni) is an element which contributes to an increase in potential and an increase in capacity of a secondary battery. The value of "x" indicating the content of nickel is not particularly limited as long as it is 0 or more and 0.27 or less, but it is preferably 0.20 or more. When the value of "x" is less than 0.20, the battery capacity at a voltage of 5 V decreases in a secondary battery formed by using a positive electrode active material obtained by using this complex hydroxide as a precursor as a positive electrode. Meanwhile, the upper limit of the value of "x" is 0.27 or less, preferably 0.26 or less, and more preferably 0.25 or less. When the value of "x" is more than 0.27, it is impossible to obtain a positive electrode active material composed of a spinel structure single phase.

The complex hydroxide according to the present embodiment can contain an additional element M in a predetermined amount in addition to manganese and nickel. As such an additional element M, it is possible to use at least one element selected from among magnesium (Mg), aluminum (Al), calcium (Ca), barium (Ba), strontium (Sr), titanium (Ti), vanadium (V), iron (Fe), chromium (Cr), cobalt (Co), copper (Cu), zirconium (Zr), niobium (Nb), molybdenum (Mo), and tungsten (W). These additive elements M are appropriately selected depending on the application of and performance required to the secondary battery formed by using a positive electrode active material obtained by using this complex hydroxide as a precursor.

"y" indicating the content of the additional element M is not particularly limited, but it is set to preferably 0 or more and 0.05 or less, preferably 0 or more and 0.025 or less, and more preferably 0.015 or more. By controlling the value of "y" to be in such a range, it is possible to impart the characteristics according to the application of and performance required to the secondary battery while securing the intended battery characteristics. Incidentally, when the value of "y" is more than 0.05, the metal element contributing to the redox reaction decreases, there is a possibility that the battery capacity decreases, and an increase in resistance of positive electrode is caused.

(2) Impurities

The complex hydroxide according to the present embodiment contains small amounts of $SO_4$ and Na as impurities to be contained in the manufacturing process other than the above essential constituent elements. Specifically, the $SO_4$ content is preferably 0.90% by weight or less and more preferably 0.60% by weight or less. In addition, the Na content is preferably 0.04% by weight or less. When the contents of these impurities are high in the complex hydroxide, lithium sulfate (or sodium sulfate) is formed on the surface layer of the positive electrode active material to form a nonconductor film when this complex hydroxide and a lithium compound are mixed to produce a positive electrode active material, and thus a battery formed by using this as a positive electrode active material has a high resistance and a decrease in capacity is caused.

(3) BET Specific Surface Area

The BET specific surface area of the complex hydroxide according to the present embodiment is 40 $m^2/g$ or more and 70 $m^2/g$ or less. A complex hydroxide having a BET specific surface area of 40 $m^2/g$ or less has a small surface area and poor reactivity with a lithium compound, and thus some particles do not grow when the complex hydroxide is calcined together with the lithium compound and the crystallinity of the complex oxide to be obtained decreases as a whole. In a battery formed of such a positive electrode active material having low crystallinity, the movement of lithium is difficult and the electrical resistance increases. On the other hand, the surface area of the complex hydroxide is too large and the reactivity thereof with the lithium compound is too high when a complex hydroxide having a BET specific surface area larger than 70 $m^2/g$ is mixed and calcined with the lithium compound, and thus the particles of lithium-manganese-nickel complex oxide to be obtained form an abnormally aggregated powder. In a battery using such an abnormally aggregated powder as a positive electrode active material, the resistance increases since the powder is not uniformly mixed with the conductive material. Incidentally, the aggregation is eliminated by pulverizing the aggregated powder by using a hammer mill or the like in some cases, but the cost increases as the steps increase, crystallinity decreases by the strain of particles generated at the time of pulverization, and the resistance also increases accordingly, and it is thus not preferable to pulverize the aggregated powder.

(4) Particle Size Distribution

In the complex hydroxide according to the present embodiment, the value which is an index indicating the expanse of particle size distribution of the particles and is determined by a formula [($d_{90}$–$d_{10}$)/average particle diameter] is 0.90 or less.

Here, $d_{90}$ and $d_{10}$ each represent the minimum length including the particle diameter of 90% or 10% of particles in the number of entire particles which are randomly subjected to the measurement of particle diameter, and it indicates that the particle size distribution of the particles is wider as the value determined by [($d_{90}$–$d_{10}$)/average particle diameter] is larger. Moreover, "the particle size distribution is wide" means that fine particles having a significantly smaller particle diameter than the average particle diameter and particles (coarse particles) having a significantly larger particle diameter than the average particle diameter are present in the complex hydroxide in large amounts.

When significantly small fine particles are present in the complex hydroxide in a large amount, the lithium-manganese-nickel complex oxide to be obtained by using this as a starting material forms an abnormal aggregate. The electric resistance of a battery to be obtained increases since such an abnormal aggregate is not uniformly mixed with the conductive material at the time of forming the battery.

In addition, when coarse particles are present in the complex hydroxide in a large amount, the contact area between the complex hydroxide particles and the lithium compound decreases and the reaction between these does not efficiently proceed when preparing lithium-manganese-nickel complex oxide using this as a starting material and thus the lithium-manganese-nickel complex oxide to be obtained becomes particles having low crystallinity. Hence, in a battery formed of such lithium-manganese-nickel complex oxide, the efficiency of lithium ion movement deteriorates, and as a result, the electrical resistance increases.

«2. Method for Manufacturing Manganese-Nickel Complex Hydroxide»

The manganese-nickel complex hydroxide according to the present embodiment can be manufactured by crystallizing manganese-nickel complex hydroxide from an aqueous solution containing manganese and nickel. Specifically, the method is characterized by depositing a hydroxide by using a sulfate salt as a metal salt when obtaining a crystal by reactive crystallization and an alkali mixed aqueous solution in which sodium carbonate is mixed with a solution of sodium hydroxide to be used as an alkali aqueous solution so as to be 20% or less in terms of Na.

(1) Crystallization Reaction

As described above, the crystallization reaction is a reaction to crystallize manganese-nickel complex hydroxide from an aqueous solution containing manganese and nickel. The crystallization reaction is not particularly limited, but examples thereof may include a reaction including a nucleation step and a particle growing step. Hereinafter, each of the nucleation step and the particle growing step will be specifically described.

(1-a) Nucleation Step

The nucleation step is a step of producing fine nuclei (fine primary particles) of manganese-nickel complex hydroxide from an aqueous solution containing manganese and nickel.

In the nucleation step, first, a mixed aqueous solution containing at least manganese and nickel is prepared. The composition ratio of each metal element contained in the complex hydroxide to be obtained is approximately the same as the ratio of the number of atoms of each metal element to the sum of the numbers of atoms of the metal elements contained in the mixed aqueous solution to be subjected to the crystallization reaction. Hence, it is possible to obtain a complex hydroxide having the intended composition by adjusting the composition ratio of each metal ion in the mixed aqueous solution so as to be the same as the composition ratio thereof in the intended complex hydroxide.

Next, an alkali aqueous solution, an aqueous solution containing an ammonium ion donor, and water are supplied into a reaction tank, and these are mixed to prepare an aqueous solution before reaction. At this time, by controlling the amount of each aqueous solution supplied, the concentration of ammonium ion is adjusted preferably to 3 g/L or more and 25 g/L or less as well as the pH value of the aqueous solution before reaction is adjusted to preferably 12.0 or higher and 14.0 or lower at a liquid temperature of 25° C. In addition, the atmosphere in the reaction tank is preferably replaced with a weakly acidic atmosphere or a non-oxidizing atmosphere as well as the temperature of the aqueous solution before reaction is preferably adjusted to 20° C. or higher and 60° C. or lower. More specifically, an inert gas such as nitrogen is introduced into the reaction tank to adjust the oxygen concentration in the reaction tank to 1% by volume or less.

After it is confirmed that the pH value of the aqueous solution before reaction, the concentration of ammonium ion, the temperature, and the atmosphere in the reaction tank have been adjusted to the conditions described above, the mixed aqueous solution containing manganese and nickel prepared is supplied into the reaction tank while stirring this aqueous solution before reaction. By this, an aqueous reaction solution in which the aqueous solution before reaction and the mixed aqueous solution are mixed is produced in the reaction tank.

Subsequently, fine nuclei (fine primary particles) composed of manganese-nickel complex hydroxide are deposited in the aqueous reaction solution. The amount of nuclei to be deposited is not particularly limited, but it is preferably set to 0.1% by mass or more with respect to the total mass of the metal compounds to be supplied in the nucleation step and the particle growing step. In addition, the upper limit value of the amount of nuclei to be deposited in the nucleation step is set to preferably 2% by mass or less and more preferably 1.5% by mass or less with respect to the total mass of the metal compounds to be supplied in the nucleation step and the particle growing step. It is possible to obtain a complex hydroxide particularly having narrow particle size distribution by depositing the nuclei in such an amount.

Incidentally, the pH value and the concentration of ammonium ion in the aqueous reaction solution change in association with the nucleation, it is preferable to control the pH value and the concentration of ammonium ion so as to be maintained in the above ranges by supplying an alkali aqueous solution and an aqueous solution containing an ammonium ion donor together with the mixed aqueous solution to the aqueous reaction solution.

The nucleation step is terminated at the time point at which a predetermined amount of nuclei are produced in the aqueous reaction solution. The amount of nuclei produced at this time can be judged by the amount of the metal compounds supplied to the aqueous reaction solution.

(1-b) Particle Growing Step

The particle growing step is a step of growing the nuclei produced in the nucleation step described above to obtain particles of manganese-nickel complex hydroxide.

In the particle growing step, first, an acidic aqueous solution such as sulfuric acid is supplied to the aqueous reaction solution obtained after the nucleation step is terminated, and the pH value of the aqueous reaction solution is adjusted to preferably 10.5 or higher and 12.0 or lower at a liquid temperature of 25° C. By adjusting and maintaining the pH value of the aqueous reaction solution in such a range, it is possible to suppress new nucleation in the aqueous reaction solution and to preferentially cause particle growth.

Subsequently, the supply of the mixed aqueous solution to the aqueous reaction solution is started, and the supply of the mixed aqueous solution is continuously conducted and the complex hydroxide particles are allowed to grow until to have the intended particle diameter (about from 1 μm to 10 μm as the average particle diameter). At this time, it is preferable that the pH value of the aqueous reaction solution is controlled so as to be maintained preferably in a range of 10.5 or higher and 12.0 or lower and the concentration of ammonium ion is controlled so as to be maintained preferably in a range of 3 g/L or more and 25 g/L or less by supplying an alkali aqueous solution and an aqueous solution containing an ammonium ion donor to the aqueous reaction solution together with the mixed aqueous solution.

Thereafter, the complex hydroxide obtained by growing the nuclei in this manner is subjected to solid-liquid separation, impurities such as residual alkali cations are washed off, and the complex hydroxide is then dried at a temperature of 100° C. or higher, whereby a powdery complex hydroxide can be obtained.

(2) Supplied Aqueous Solutions

Next, a mixed aqueous solution to be a starting material of a complex hydroxide, an alkali aqueous solution for pH control, and an aqueous solution which is for controlling the concentration of ammonium ion and thus contains an ammonium ion donor will be described.

(2-a) Mixed Aqueous Solution

Figure 2:
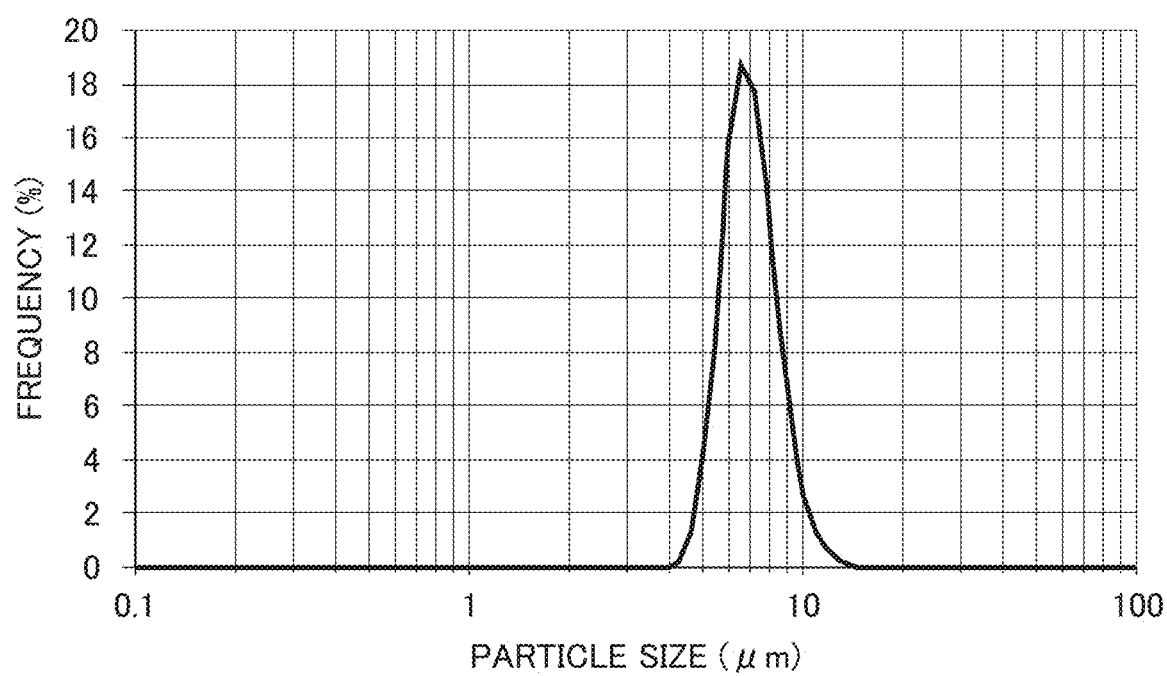
FIG. 2 is a particle size profile view illustrating an example of particle size distribution of particles of manganese-nickel complex hydroxide according to the present invention.

In the present embodiment, sulfate salts are used as the manganese compound and nickel compound to be contained in the mixed aqueous solution. Specifically, it is preferable to use manganese sulfate and nickel sulfate. As the crystallization is conducted by using the mixed aqueous solution using sulfate salts as the manganese source and the nickel source in this manner, for example, a complex hydroxide of which the particles have sphericity as illustrated in the photograph of FIG. 1 and also complex hydroxide particles having a normal distribution having narrow particle size distribution as illustrated in FIG. 2 are produced.

Figure 3:
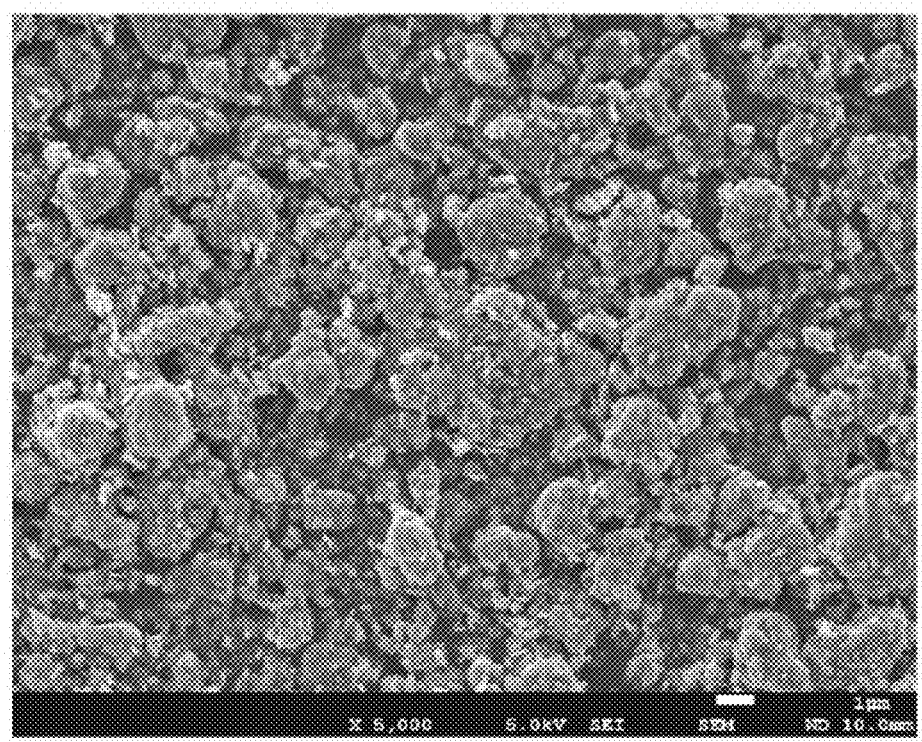
FIG. 3 is an SEM photograph illustrating the shape of particles of manganese-nickel complex hydroxide obtained in the case of conducting a crystallization reaction by using manganese nitrate and nickel nitrate as starting materials. It is a view illustrating.
Figure 4:
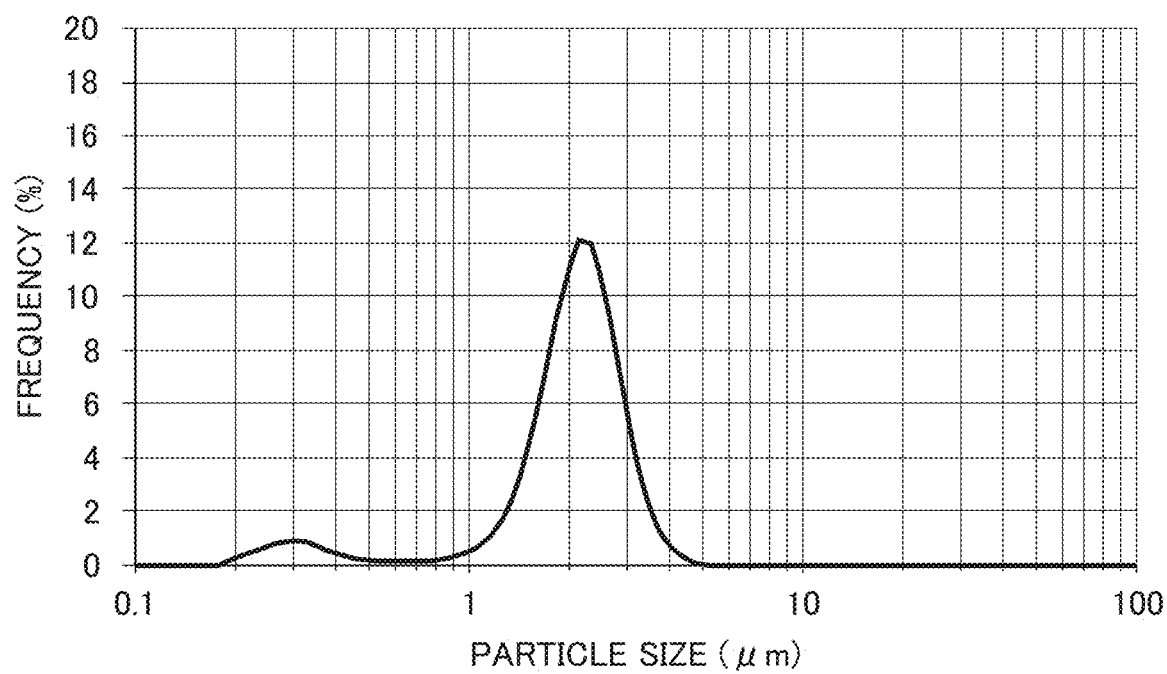
FIG. 4 is a particle size profile view illustrating an example of particle size distribution of particles of manganese-nickel complex hydroxide obtained in the case of conducting a crystallization reaction by using manganese nitrate and nickel nitrate as starting materials.
Figure 5:
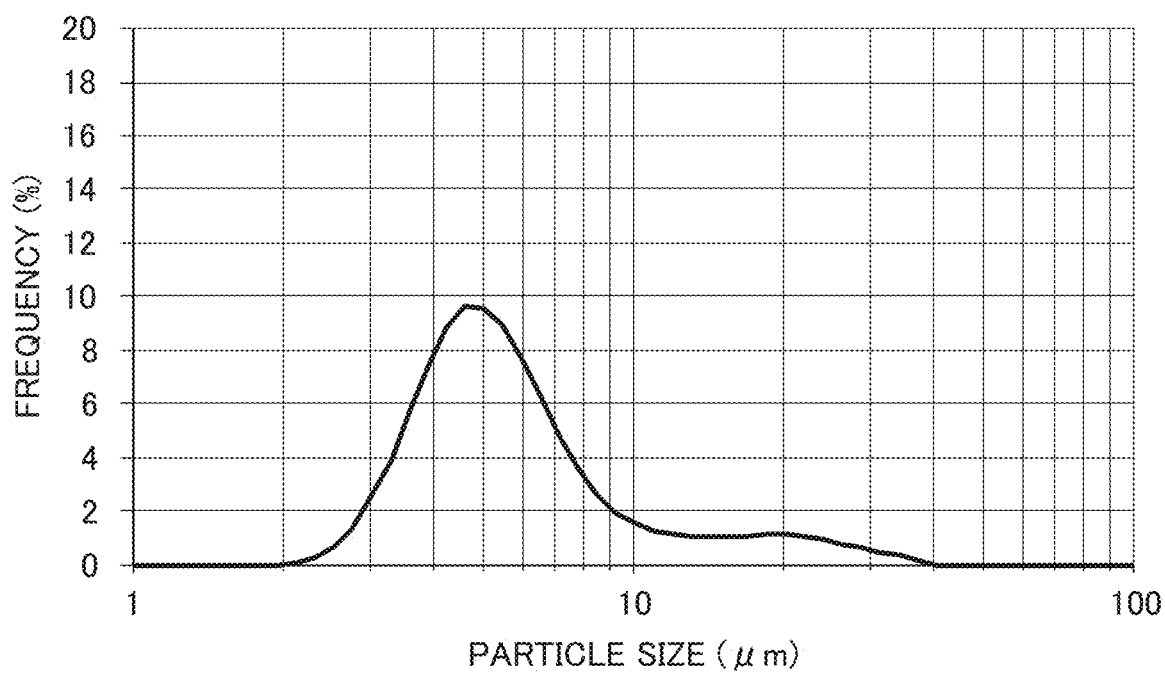
FIG. 5 is a particle size profile view illustrating an example of particle size distribution of particles of lithium-manganese-nickel complex oxide manufactured by using manganese-nickel complex hydroxide obtained in the case of conducting a crystallization reaction by using manganese nitrate and nickel nitrate as starting materials.

Here, examples of metal salts other than the sulfate salts may include a nitrate salt and a chloride salt. However, for example, when the crystallization reaction is conducted by using manganese nitrate and nickel nitrate, which are nitrate salts, as the metal salts, nucleation simultaneously proceeds even during the particle growth by the influence of $NO_3$ ions in the reaction tank and non-spherical fine particles are thus observed here and there, for example, as illustrated in the photograph of FIG. 3. In addition, the particles have a large expanse of particle size distribution and a peak appears particularly on the fine particle side having a small particle diameter as illustrated in FIG. 4. Furthermore, in the lithium-manganese-nickel complex oxide to be obtained by using such a complex hydroxide as a starting material, a peak of an abnormal aggregate is observed in the particle size distribution as illustrated in FIG. 5.

Figure 6:
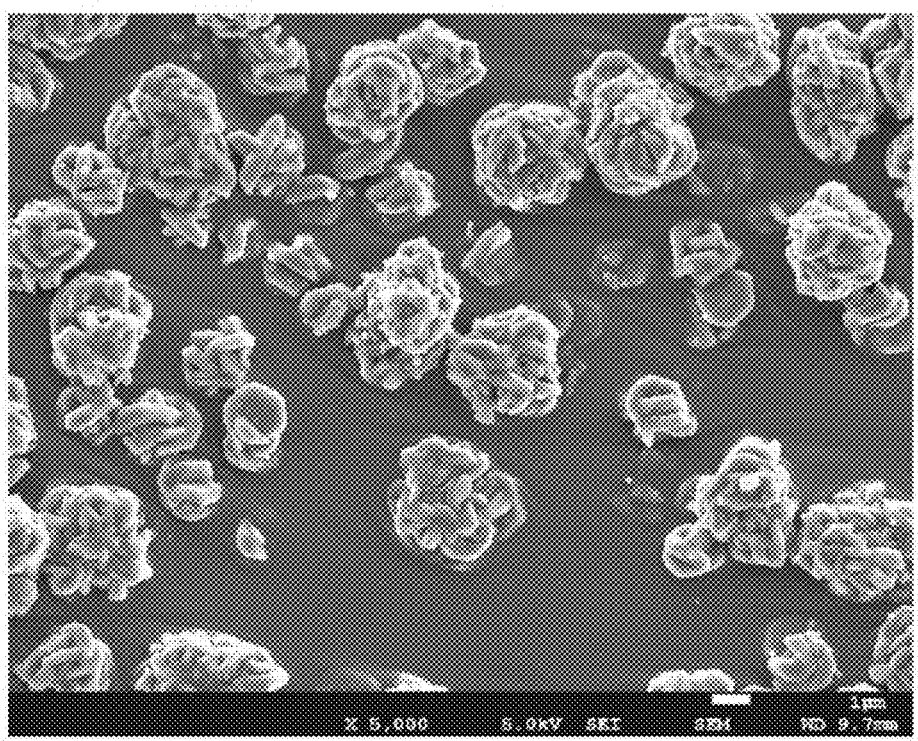
FIG. 6 is a SEM photograph illustrating the shape of particles of manganese-nickel complex hydroxide obtained in the case of conducting a crystallization reaction by using manganese chloride and nickel chloride as starting materials.
Figure 7:
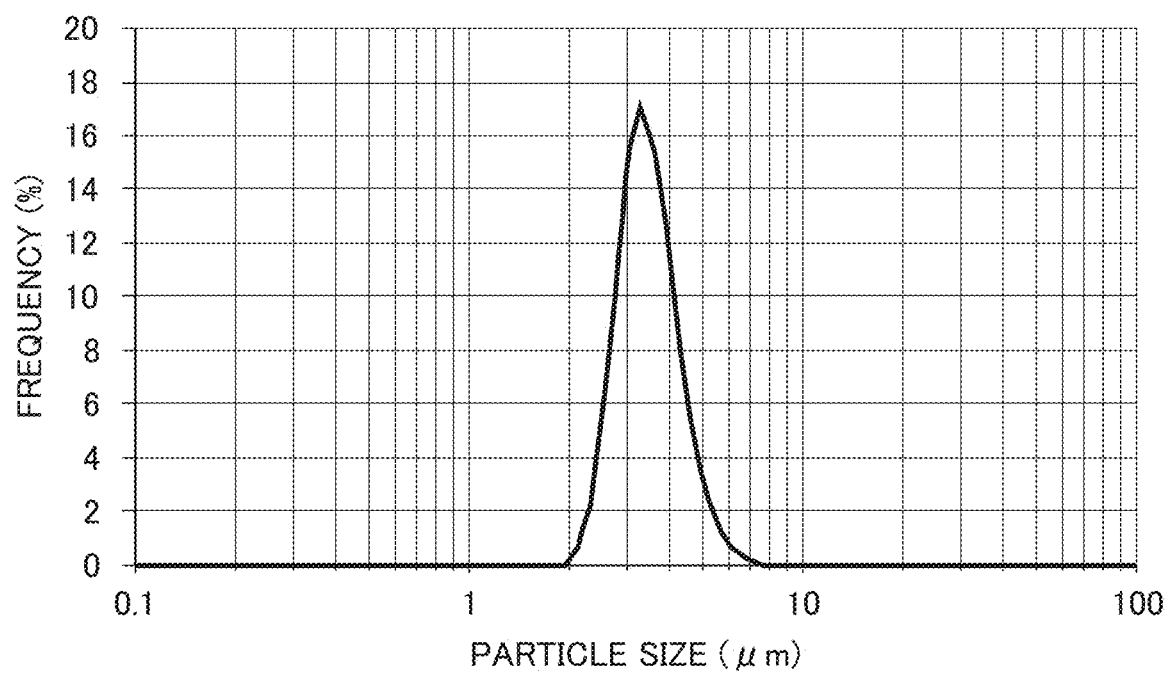
FIG. 7 is a particle size profile view illustrating an example of particle size distribution of particles of manganese-nickel complex hydroxide obtained in the case of conducting a crystallization reaction by using manganese chloride and nickel chloride as starting materials.

In addition, when the crystallization reaction is conducted by using manganese chloride and nickel chloride, which are chloride salts, as the metal salts, the complex hydroxide to be obtained exhibits sphericity, for example, as illustrated in the photograph of FIG. 6 and a complex hydroxide having a small expanse of particle size distribution is produced as illustrated in FIG. 7, but the primary particles grow large and the particles grow densely by the influence of Cl ions, and the BET specific surface area is from 20 to 30 m$^2$/g to be remarkably small. Hence, the complex metal hydroxide particles obtained in this manner have low reactivity with a lithium compound.

From the facts described above, it is preferable to use a sulfate salt as the metal salt.

In addition, in the case of containing an additional element M (M is at least one element selected from among Mg, Al, Ca, Ba, Sr, V, Fe, Cr, Ti, Co, Cu, Zr, Nb, Mo, and W) in the complex hydroxide, the compound for supplying the additional element M is not particularly limited, but it is preferable to use a water-soluble compound. Specifically, it is preferable to use a sulfate salt, and examples thereof may include magnesium sulfate, aluminum sulfate, calcium sulfate, barium sulfate, strontium sulfate, vanadium sulfate, ammonium vanadate, iron sulfate, chromium sulfate, titanium sulfate, cobalt sulfate, copper sulfate, zirconium sulfate, niobium oxalate, ammonium molybdate, sodium tungstate, and ammonium tungstate. Incidentally, the amount of the additional element M added is a small amount, and thus the $SO_4$ content in the aqueous reaction solution is extremely small and the powder characteristics are not affected even if a metal salt other than a sulfate salt is used.

The concentration of the mixed aqueous solution is not particularly limited, but it is preferably 1 mol/L or more as the sum of the metal compounds to be contained in the mixed aqueous solution. The amount of crystallized product per reaction tank decreases and the productivity decreases when the concentration of the mixed aqueous solution is less than 1 mol/L. Meanwhile, the upper limit value of the concentration of the mixed aqueous solution is preferably 2.6 mol/L or less and more preferably 2.3 mol/L or less. When the concentration of the mixed aqueous solution is higher than 2.6 mol/L, it is concerned that the concentration of the mixed aqueous solution is higher than the saturation concentration when the reaction temperature is decreased, crystals of the respective metal compounds are redeposited, and the pipe and the like are clogged.

Incidentally, the manganese compound, the nickel compound, and the compound of the additional element M described above are not necessarily supplied to the reaction tank as a mixed aqueous solution. For example, in a case in which a compound other than the intended compound is produced by mixing, aqueous solutions of metal compounds may be individually prepared and the aqueous solutions may be supplied into the reaction tank at a predetermined proportion so that the total concentration of all the aqueous solutions of metal compounds are in the above range.

In addition, the amount of the mixed aqueous solution supplied is not particularly limited, but it is supplied so that the concentration of the product in the aqueous reaction solution is preferably 30 g/L and more preferably 50 g/L at the time point at which the crystallization reaction is terminated. It is concerned that the aggregation of primary particles is insufficient when this concentration is lower than 30 g/L. Meanwhile, the amount of the mixed aqueous solution supplied is adjusted so that the upper limit value of the concentration of the product in the aqueous reaction solution at the time point at which the crystallization reaction is terminated is preferably 200 g/L or less and more preferably 150 g/L or less. When this concentration is higher than 200 g/L, it is concerned that the mixed aqueous solution to be supplied to the aqueous reaction solution is not sufficiently mixed and the particle growth is biased.

(2-b) Alkali Aqueous Solution

As the alkali aqueous solution, an alkali mixed aqueous solution containing sodium hydroxide and sodium carbonate is used.

Here, it is preferable to use a solution of sodium hydroxide as an alkali aqueous solution from the viewpoint of economic efficiency since sodium hydroxide is inexpensive. However, sodium hydroxide forms a double salt of sparingly soluble sulfate radical with $SO_4$ and this is incorporated into manganese-nickel complex hydroxide, and a possibility that the $SO_4$ content in the manganese-nickel complex hydroxide increases thus increases.

The inventors of the present invention have found out that it is possible to decrease the content of $SO_4$ to be incorporated into the complex hydroxide by using an alkali mixed aqueous solution to be obtained by adding sodium carbonate to a solution of sodium hydroxide. Although the reason for this is not clear, it is considered that a sodium ion forms a double salt which is more stable than the sulfate radical with a carbonate ion and it is also considered that the double salt is hardly incorporated into the crystal structure of manganese-nickel complex hydroxide.

As described above, it is possible to decrease the amount of $SO_4$ to be incorporated into the crystal structure of manganese-nickel complex hydroxide by using an alkali mixed aqueous solution in which sodium carbonate is added to an alkali aqueous solution.

With regard to the content of sodium carbonate in the alkali mixed aqueous solution, it is considered that the content of $SO_4$ to be incorporated into the complex hydroxide can be decreased as the amount of sodium carbonate used increases, but there is a possibility that excess double salts formed by excess carbonate ions and sodium ions are incorporated into the crystal structure of the hydroxide, and a possibility that the Na content in manganese-nickel complex hydroxide to be obtained increases thus increases.

Hence, the mixing ratio of sodium carbonate to the sodium hydroxide solution is set to a ratio so that the proportion of the number of moles of sodium derived from sodium carbonate to the number of moles of entire sodium to be contained in the alkali mixed aqueous solution to be obtained is 20% or less, it is more preferably a ratio so that the proportion is 15% or less, and an alkali mixed aqueous solution is prepared so as to have such a proportion.

In addition, the lower limit value of the proportion of the number of moles of sodium derived from sodium carbonate to the number of moles of entire sodium in the mixing ratio of sodium carbonate to the sodium hydroxide solution is not particularly limited, and it may be any value (more than 0%) as long as sodium carbonate is contained in the alkali mixed aqueous solution. In addition, it is set to preferably 0.1% or more, more preferably 1% or more, and still more preferably 2% or more. It is possible to obtain the effect of decreasing the $SO_4$ content as long as sodium carbonate is contained in the alkali mixed aqueous solution even though this mixing ratio of sodium carbonate is significantly low.

Incidentally, the method for supplying the alkali mixed aqueous solution is not particularly limited as long as the pH value of the aqueous reaction solution does not locally increase but is maintained in a predetermined range. Examples thereof may include a method in which the alkali mixed aqueous solution is supplied by using a pump capable of controlling the flow rate such as a constant rate pump while sufficiently stirring the aqueous reaction solution.

(2-c) Aqueous Solution Containing Ammonium Ion Donor

The aqueous solution containing an ammonium ion donor is not particularly limited, but specifically, it is possible to use ammonia water or an aqueous solution of an ammonium salt such as ammonium sulfate or ammonium chloride.

In the case of using ammonia water as the ammonium ion donor, the concentration thereof is not particularly limited, but specifically, it is preferably 20% by mass or more and more preferably 22% by mass or more. In addition, the upper limit value of the concentration in the case of using ammonia water is preferably 30% by mass or less and more preferably 28% by mass or less. By setting the concentration of ammonia water to be in such a range, it is possible to suppress the loss of ammonia due to volatilization and the like to the minimum and thus to improve the production efficiency.

Incidentally, the method for supplying the aqueous solution containing an ammonium ion donor is not particularly limited, but examples thereof may include a method in which the aqueous solution containing an ammonium ion donor is supplied by using a pump capable of controlling the flow rate in the same manner as the alkali mixed aqueous solution.

(3) Reaction Conditions (3-a) pH Value

In the method for manufacturing a complex hydroxide according to the present embodiment, it is preferable to control the pH value at a liquid temperature of 25° C. to be in a range of 12.0 or higher and 14.0 or lower in the nucleation step and in a range of 10.5 or higher and 12.0 or lower in the particle growing step. Incidentally, it is preferable to maintain the fluctuating range of the pH value during the crystallization reaction within ±0.2 in both steps. When the fluctuating range of the pH value is large, it is concerned that the amount of nuclei produced and the proportion of particle growth are not constant and complex hydroxide particles having narrow particle size distribution cannot be obtained.

[Nucleation Step]

The pH value of the aqueous reaction solution in the nucleation step is not particularly limited, but it is controlled so as to be 12.0 or higher and more preferably 12.3 or higher at a liquid temperature of 25° C. When the pH value is lower than 12.0, the growth (particle growth) of the nuclei produced proceeds together with the nucleation, thus the particle diameter of the complex hydroxide particles to be obtained is nonuniform and the particle size distribution widens. Meanwhile, the upper limit of the pH value is controlled so as to be preferably 14.0 or lower and more preferably 13.5 or lower at a liquid temperature of 25° C. When the pH value is higher than 14.0, the nuclei to be formed are too fine and thus a problem arises that the aqueous reaction solution gels.

[Particle Growing Step]

The pH value of the aqueous reaction solution in the particle growing step is controlled so as to be preferably 10.5 or higher and more preferably 10.7 or higher at a liquid temperature of 25° C. Meanwhile, the upper limit of the pH value is controlled so as to be preferably 12.0 or higher and more preferably 11.8 or higher at a liquid temperature of 25° C. The production of new nuclei is suppressed and the particle growth preferentially proceeds by controlling the pH value in the particle growth step to be in such a range, and thus the complex hydroxide particles to be obtained can be homogeneous and have narrow particle size distribution. On the contrary, the concentration of ammonium ion increases and the solubility of the metal ion increases when the pH value is lower than 10.5, and thus not only the rate of crystallization reaction decreases but also the amount of metal ions remaining in the aqueous reaction solution increases and the productivity deteriorates. In addition, when the pH value is higher than 12.0, there is a possibility that the amount of nuclei produced in the particle growing step increases and the particle diameter of the complex hydroxide particles to be obtained is nonuniform.

Incidentally, it is a boundary condition between nucleation and particle growth that the pH value in the aqueous reaction solution is 12.0, and it can be thus used as the condition of either of the nucleation step or the particle growing step depending on the presence or absence of nuclei in the aqueous reaction solution. In other words, a large amount of nuclei is present in the aqueous reaction solution when the pH value in the nucleation step is set to be higher than 12.0 to produce nuclei in a large amount and then the pH value in the particle growing step is set to 12.0, and thus particle growth preferentially proceeds and a complex hydroxide having narrow particle size distribution can be more efficiently obtained. Meanwhile, nuclei to grow are not present in the aqueous reaction solution when the pH value in the nucleation step is set to 12.0, and thus nucleation preferentially proceeds. In this case, it is possible to effectively grow the nuclei produced and to obtain a favorable complex hydroxide by setting the pH value in particle growing step to be lower than 12.0.

(3-b) Concentration of Ammonium Ion

The concentration of ammonium ion in the aqueous reaction solution is not particularly limited, but it is kept at a constant value within a range of preferably 3 g/L or more and more preferably 5 g/L or more. The ammonium ion functions as a complexing agent in the aqueous reaction solution, and there is thus a possibility that the solubility of the metal ion cannot be kept constant when the concentration of ammonium ion is less than 3 g/L. In addition, the aqueous reaction solution is likely to gel and it is difficult to obtain complex hydroxide particles having well-arranged shape and particle diameter. Meanwhile, as the upper limit value of the concentration of ammonium ion, the concentration of ammonium ion is kept at a constant value within a range of preferably 25 g/L or less and more preferably 15 g/L or less. The solubility of the metal ion is too high when the concentration of ammonium ion is higher than 25 g/L, and thus the amount of metal ions remaining in the aqueous reaction solution increases and composition deviation and the like are caused.

Incidentally, when the concentration of ammonium ion fluctuates during the crystallization reaction, it is concerned that the solubility of the metal ion fluctuates and uniform complex hydroxide particles are not formed. Hence, it is preferable to control the fluctuating range of the concentration of ammonium ion to be in a certain range throughout the nucleation step and the particle growing step, and specifically, it is preferable to control the fluctuating range to ±5 g/L.

(3-c) Reaction Temperature

The temperature (reaction temperature) of the aqueous reaction solution is not particularly limited, but it is controlled to be in a range of preferably 20° C. or higher and more preferably 20° C. or higher and 60° C. or lower throughout the nucleation step and the particle growing step. When the reaction temperature is lower than 20° C., nucleation is likely to occur by a decrease in solubility of the aqueous reaction solution and it is difficult to control the average particle diameter and particle size distribution of the complex hydroxide particles to be obtained in some cases. In addition, when the temperature is higher than 60° C., it is concerned that volatilization of ammonia is promoted, the amount of the aqueous solution containing an ammonium ion donor to be supplied for controlling the ammonium ion in the aqueous reaction solution to be in a certain range increases, and the production cost increases.

(3-d) Control of Particle Diameter of Complex Hydroxide

The particle diameter of complex hydroxide can be controlled by the reaction time in the particle growing step. In other words, the reaction in the particle growing step may be continuously conducted until to have the desired particle diameter.

In addition, the particle diameter of the complex hydroxide particles can be controlled not only by the conditions in the particle growing step but also by the pH value in the aqueous reaction solution and the amount of the metal compounds put for nucleation in the nucleation step. In other words, the number of nuclei to be produced is increased by shifting the pH value at the time of nucleation to a higher pH value side or increasing the nucleation time to increase the amount of the metal compounds to be put. This makes it possible to decrease the particle diameter of the complex hydroxide particles to be obtained even in the case of conducting the reaction in the particle growing step under the same conditions. On the other hand, it is possible to increase the particle diameter of the complex hydroxide particles to be obtained by controlling the pH value and the nucleation time so that the number of nuclei to be produced decreases.

«3. Lithium-Manganese-Nickel Complex Oxide»

(1) Composition

By using the complex hydroxide according to the present embodiment, it is possible to obtain cubic lithium-manganese-nickel complex oxide (hereinafter also simply referred to as the "complex oxide") which is represented by general formula (B):$Li_tMn_2(1-x-y)Ni_{2x}M_{2y}O_4$ ($0.96 \leq t \leq 1.20$, $0.20 \leq x \leq 0.28$, $0 \leq y \leq 0.05$, and M is at least one element selected from among Mg, Al, Ca, Ba, Sr, Ti, V, Fe, Cr, Co, Cu, Zr, Nb, Mo, and W) and has a spinel structure.

This lithium-manganese-nickel complex oxide can be used as a positive electrode active material, and for example, a nonaqueous electrolyte secondary battery can be formed by using a positive electrode active material containing such a complex oxide.

In the lithium-manganese-nickel complex oxide, the value of "t" indicating the content of lithium (Li) is not particularly limited as long as it is 0.96 or more and 1.20 or less, but it is preferably 0.98 or more and more preferably 1.00 or more. By adjusting the value of "t" to be in the above range, it is possible to improve the output characteristics and capacity characteristics of the secondary battery formed of a positive electrode active material containing this lithium-manganese-nickel complex oxide. On the contrary, the resistance of positive electrode of the secondary battery increases when the value of "t" is less than 0.96, and it is thus not possible to improve the output characteristics. In addition, the initial discharge capacity decreases when the value of "t" is more than 1.20.

Incidentally, the ranges of the value of "x" and the value of "y" and the critical significance thereof in general formula (B) are the same as the ranges of the respective values and the critical significance thereof in general formula (A), and the description thereon here is omitted.

(2) Impurities

In the complex oxide according to the present embodiment, the content of $SO_4$ of an impurity is 0.90% by weight or less and the Na content is 0.04% by weight or less. $SO_4$ and Na are present in the particles of the complex oxide as impurities mainly as lithium sulfate (or sodium sulfate) in some cases, and lithium sulfate (or sodium sulfate) is formed on the surface layer of the positive electrode active material to be a nonconductor film. These impurities cause a high resistance when a battery is formed by using this complex oxide as a positive electrode active material, and these impurities particularly remarkably affect the battery in a case in which the $SO_4$ content is larger than 0.90% by weight or the Na content is larger than 0.04% by weight.

«4. Method for Manufacturing Lithium-Manganese-Nickel Complex Oxide»

The method for manufacturing a positive electrode active material containing lithium-manganese-nickel complex oxide particles is not particularly limited, but examples thereof may include a method in which lithium is mixed with the complex hydroxide described above to obtain a lithium mixture (mixing step) and the lithium mixture is then calcined under predetermined conditions to obtain lithium-manganese-nickel complex oxide particles (calcination step).

Incidentally, as a method for manufacturing a positive electrode active material, it is also possible to provide a step (temporary calcination step) of temporarily calcining the lithium mixture before the calcination step, a step (pulverization step) of pulverizing the lithium-manganese-nickel complex oxide particles after temporary calcination, and a step (annealing treatment step) of annealing the lithium-manganese-nickel complex oxide particles in addition to the mixing step and calcination step described above if necessary. Hereinafter, the respective steps will be described in detail in order.

(1) Mixing Step

The mixing step is a step of mixing a lithium compound with the complex hydroxide described above to obtain a lithium mixture.

The ratio [Li/Me] of the number of atoms of lithium (Li) to the sum (Me) of the numbers of atoms of the metals (Mn, Ni, and additional element M) other than lithium is not particularly limited, but the lithium compound is mixed so that the ratio is preferably 0.48 or more, more preferably 0.49 or more, and still more preferably 0.50 or more. In addition, as the upper limit value of the ratio [Li/Me], the lithium compound is mixed so that the ratio is preferably 0.60 or less. Li/Me does not change before and after the calcination step, and Li/Me in this mixing step is Li/Me in the lithium-manganese-nickel complex oxide. Hence, it is required to mix the lithium compound with the complex hydroxide of a starting material so that Li/Me in the lithium mixture is the same as Li/Me in the lithium-manganese-nickel complex oxide having the intended composition.

The lithium compound is not particularly limited, and for example, it is possible to use lithium hydroxide, lithium nitrate, lithium carbonate, or a mixture thereof. Among these, it is particularly preferable to use lithium carbonate from the viewpoint of ease of handling and stability of quality.

It is preferable that the complex hydroxide and the lithium compound are sufficiently mixed to the extent to which a fine powder is not produced before calcination. When mixing is insufficiently conducted, Li/Me varies among the individual particles and sufficient battery characteristics cannot be obtained. Incidentally, a general mixer can be used for mixing. Specifically, it is possible to use a shaker mixer, a Lodige mixer, a Julia mixer, a V blender, and the like.

(2) Temporary Calcination Step

Although it is not an essential aspect, it is preferable that the lithium mixture obtained is temporarily calcined by being held at a temperature which is lower than the calcination temperature and 350° C. or higher and 750° C. or lower for about from 1 to 20 hours before calcination in the calcination step to be described later in the case of using lithium hydroxide or lithium carbonate as the lithium compound.

In such a temporary calcination treatment, the lithium mixture is held in the vicinity of the melting point of lithium hydroxide or lithium carbonate or in the vicinity of the reaction temperature for a certain time, and it is thus possible to promote the diffusion of lithium into the complex hydroxide of a starting material and to obtain lithium-manganese-nickel complex oxide particles having more uniform composition. Incidentally, it is more preferable that the temporary calcination temperature is set to a temperature which is lower than the calcination temperature and 400° C. or higher and 700° C. or lower and the holding time at this temperature is set to 15 hours or shorter.

(3) Calcination Step

The calcination step is a step of calcining the lithium mixture obtained in the mixing step or the lithium mixture subjected to the temporary calcination treatment in the temporary calcination step after the mixing step at a predetermined temperature.

The calcination treatment in the calcination step can be conducted by putting the lithium mixture into a kiln. The kiln is not particularly limited as long as it can calcine the lithium mixture in an atmosphere to be described later, and either a batch type furnace or a continuous type furnace can be used. Among these, it is preferable to use an electric furnace which does not generate gas.

The calcination atmosphere is not particularly limited as long as it is an oxidizing atmosphere, and it is preferable to conduct the calcination treatment in an atmosphere having an oxygen concentration of from 18% by volume to 100% by volume, namely, in an air stream to an oxygen stream, and it is more preferable to conduct the calcination treatment in the air stream when taking the cost into consideration. When the oxygen concentration is less than 18% by volume, it is concerned that the oxidation reaction does not sufficiently proceed and the crystallinity of the lithium-manganese-nickel complex oxide particles is not sufficient.

The calcination temperature is not particularly limited, but it is preferably higher than 850° C., more preferably 860° C. or higher, and still more preferably 875° C. or higher. The specific surface area of the lithium-manganese-nickel complex oxide particles to be obtained is too large when the calcination temperature is 850° C. or lower, and thus a film is formed by the side reaction occurring between the positive electrode active material containing the lithium-manganese-nickel complex oxide particles and the electrolytic solution in the secondary battery and the resistance of positive electrode increases. Meanwhile, the upper limit value of the calcination temperature is preferably lower than 950° C., more preferably 940° C. or lower, and still more preferably 925° C. or lower. The complex hydroxide to be a starting material or the lithium-manganese-nickel complex oxide includes those having hollow particles, but it is concerned that sintering among the particles proceeds and the hollow structure disappears when such hollow particles are calcined at 950° C. or higher. The specific surface area is smaller than that of the particles having a hollow structure when the hollow structure disappears, and it is thus concerned that the resistance of positive electrode increases and the output characteristics decrease in the case of forming a secondary battery by using this as a positive electrode active material.

The holding time (calcination time) at the calcination temperature is set to preferably 3 hours or longer and more preferably 5 hours. It is impossible to sufficiently react the complex hydroxide with the lithium compound in some cases when the calcination time is shorter than 3 hours. Meanwhile, the upper limit value of the calcination time is preferably set to 24 hours or shorter. It is not only impossible to obtain further effects but also the productivity deteriorates even when the calcination time is longer than 24 hours.

(4) Pulverization Step

The pulverization step is a step of pulverizing the aggregate or sintered body of the lithium-manganese-nickel complex oxide particles obtained through aggregation or slight sintering by calcination in the calcination step.

The lithium-manganese-nickel complex oxide particles after calcination are aggregated or slightly sintered in some cases. In such a case, it is preferable to pulverize the aggregate or sintered body of the lithium-manganese-nickel complex oxide particles. This makes it possible to handle the lithium-manganese-nickel complex oxide particles as a powder having an appropriate particle diameter and to further improve the filling property of the lithium-manganese-nickel complex oxide particles in the case of being used as a positive electrode active material. Incidentally, the pulverization refers to an operation to apply mechanical energy to an aggregate composed of a plurality of secondary particles produced by sintering, necking, and the like between the secondary particles at the time of calcination and to separate the secondary particles almost without destroying the secondary particles themselves.

The method for pulverization is not particularly limited, and any known means can be used. Specific examples thereof may include a method using a pin mill, a hammer mill, and the like. Incidentally, at this time, it is preferable to adjust the pulverizing force in an appropriate range so as not to destroy the secondary particles.

(5) Annealing Treatment Step

The annealing treatment step is a step of annealing the lithium-manganese-nickel complex oxide particles after calcination or pulverization in a temperature region to be lower than the calcination temperature in the calcination step. It is possible to decrease oxygen defects in the lithium-manganese-nickel complex oxide particles generated by calcination in a high temperature region and to enhance the crystallinity thereof by subjecting the lithium-manganese-nickel complex oxide particles to an annealing treatment in this manner.

The atmosphere for the annealing treatment is not particularly limited as long as it is an oxidizing atmosphere, but in the same manner as the atmosphere in the calcination step, it is preferable to conduct the annealing treatment in an atmosphere having an oxygen concentration of 18% by volume or more and 100% by volume or less, namely, in an air stream to an oxygen stream, and it is more preferable to conduct the annealing treatment in the air stream when taking the cost into consideration. When the oxygen concentration is lower than 18% by volume, there is a possibility that the oxidation reaction does not sufficiently proceed and the oxygen defects in the lithium-manganese-nickel complex oxide particles generated by the crystallization reaction, the atmosphere, and the like cannot be sufficiently decreased.

The temperature for the annealing treatment is not particularly limited as long as it is lower than the calcination temperature, and it is preferably 500° C. or higher, more preferably 600° C. or higher, and still more preferably 650° C. or higher. There is a possibility that oxygen defects cannot be sufficiently decreased when the annealing treatment temperature is lower than 500° C. Meanwhile, the upper limit value of the temperature for the annealing treatment is preferably 800° C. or lower and more preferably 750° C. or lower. Oxygen defects are further generated in the lithium-manganese-nickel complex oxide particles and the crystallinity deteriorates when the temperature for the annealing treatment is higher than 800° C.

The time for the annealing treatment is not particularly limited, and it is preferably 5 hours or longer, more preferably 10 hours or longer, and still more preferably 20 hours or longer. There is a possibility that oxygen defects cannot be sufficiently decreased when the time for the annealing treatment is shorter than 5 hours. Meanwhile, the upper limit value of the time for the annealing treatment is preferably 40 hours or shorter. It is not only impossible to obtain further effects but also the productivity deteriorates even when the annealing time is longer than 40 hours.

«5. Nonaqueous Electrolyte Secondary Battery Using Positive Electrode Active Material»

The nonaqueous electrolyte secondary battery includes a positive electrode having a positive electrode active material, a negative electrode, a separator, and a nonaqueous electrolytic solution. Incidentally, the embodiment to be described below is merely an example, and this nonaqueous electrolyte secondary battery can be implemented in various modified and improved forms based on the embodiment described in the present specification and the knowledge of those skilled in the art. In addition, the following description does not particularly limit the application of this nonaqueous electrolyte secondary battery.

(1) Positive Electrode

The positive electrode is composed of, for example, a positive electrode active material and a current collector coated with a positive electrode mixture containing the positive electrode active material. In the present embodiment, a positive electrode active material containing lithium-manganese-nickel complex oxide obtained by mixing and calcining the manganese-nickel complex hydroxide described above and a lithium compound is used as the positive electrode active material.

The positive electrode can be fabricated, for example, in the following manner by using a positive electrode active material. Incidentally, the method for fabricating the positive electrode is not limited to the following method, and the positive electrode may be fabricated by another method.

First, a powdery positive electrode active material containing lithium-manganese-nickel complex oxide, a conductive material, and a binder are mixed together, an intended solvent such as activated carbon or viscosity control is further added to the mixture if necessary, and this mixture is kneaded to fabricate a positive electrode mixture paste. The mixing ratio among the respective components in the positive electrode mixture paste is appropriately selected depending on the application of and performance required to the secondary battery and is not particularly limited, but it is possible to set the content of the positive electrode active material to 60 parts by mass or more and 95 parts by mass or less, the content of the conductive material to 1 part by mass or more and 20 parts by mass or less, and the content of the binder to 1 part by mass or more and 20 parts by mass or less when the solid components in the positive electrode mixture excluding the solvent is set to 100 parts by mass in the same manner as in the positive electrode of a general nonaqueous electrolyte secondary battery.

Next, the positive electrode mixture paste thus obtained is applied on the surface of a current collector made of an aluminum foil, for example, and dried to scatter the solvent. In addition, the resultant can be pressurized by a roll press or the like in order to increase the electrode density if necessary. By such an operation, a sheet-like positive electrode can be fabricated. Incidentally, the sheet-like positive electrode can be cut or the like into a proper size depending on the size of the intended battery and used in the fabrication of the battery.

The conductive material is not particularly limited, and it is possible to use, for example, graphite (natural graphite, artificial graphite, expanded graphite, and the like) and carbon black-based materials such as acetylene black and Ketjen black (registered trademark).

The binder is not particularly limited as long as it serves a function to bind the active material particles, and it is possible to use, for example, polyvinylidene fluoride (PVDF), polytetrafluoroethylene (PTFE), fluororubber, ethylene propylene diene rubber, styrene butadiene, a cellulose-based resin, and polyacrylic acid.

In addition, it is also possible to add a solvent to the positive electrode mixture in order to disperse the positive electrode active material, the conductive material, and the activated carbon and to dissolve the binder. The solvent is not particularly limited, but it is possible to use, for example, an organic solvent such as N-methyl-2-pyrrolidone. In addition, it is possible to add activated carbon to the positive electrode mixture in order to increase the capacity of electric double layer.

(2) Negative Electrode

As the negative electrode, it is possible to use one formed by coating the surface of a current collector made of a metal foil such as copper with a negative electrode mixture obtained by mixing a binder with metal lithium, a lithium alloy, or the like, or a negative electrode active material capable of occluding and detaching lithium ions, adding a proper solvent to the mixture, and forming the mixture into a paste, drying the negative electrode mixture, and, if necessary, compressing the resultant in order to increase the electrode density.

The negative electrode active material is not particularly limited, and it is possible to use, for example, natural graphite, artificial graphite, a calcined body of an organic compound such as a phenolic resin, or a powdered body of a carbon substance such as coke. In addition, a fluorine-containing resin such as PVDF can be used as the binder of negative electrode in the same manner as in the positive electrode. In addition, an organic solvent such as N-methyl-2-pyrrolidone can be used as a solvent for dispersing these negative electrode active material and binder.

(3) Separator

A separator is disposed to be sandwiched between the positive electrode and the negative electrode. The separator separates the positive electrode and the negative electrode from each other and holds the electrolyte, and it is possible to use a thin film, such as polyethylene or polypropylene, having a large number of minute holes.

(4) Nonaqueous Electrolytic Solution

The nonaqueous electrolytic solution is obtained by dissolving a lithium salt as a supporting salt in an organic solvent.

The organic solvent is not particularly limited, examples thereof may include cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate, and these can be used singly or in admixture of two or more kinds thereof.

The supporting salt is not particularly limited, and it is possible to use, for example, $LiPF_6$, $LiBF_4$, $LiClO_4$, $LiAsF_6$, $LiN(CF_3SO_2)_2$, and any complex salt thereof.

Incidentally, although it is not an essential aspect, it is possible to contain a radical scavenger, a surfactant, a flame retardant, and the like in the nonaqueous electrolytic solution in order to improve battery characteristics.

(5) Shape and Configuration of Battery

The shape of the nonaqueous electrolyte secondary battery is not particularly limited, and for example, it can be various shapes such as a cylindrical shape and a laminated shape.

Regardless of the shape, the positive electrode and the negative electrode are laminated via the separator to obtain an electrode body and the electrode body thus obtained is impregnated with the nonaqueous electrolytic solution. Thereafter, the current collector of positive electrode and the positive electrode terminal to communicate with the exterior are connected to each other by using a current collecting lead and the current collector of negative electrode and the negative electrode terminal to communicate with the exterior are connected to each other by using a current collecting lead, respectively, and these are sealed in a battery case. In this manner, a nonaqueous electrolyte secondary battery can be fabricated.

(6) Characteristics

In the present embodiment, the lithium-manganese-nickel complex oxide particles described above are used as a positive electrode active material, and a nonaqueous electrolyte secondary battery formed of such a positive electrode active material has a high capacity and excellent output characteristics while having a high action potential. Specifically, in a case in which a 2032 type coin battery is formed and the battery is charged to a cut-off voltage of 5.0 V by setting the current density at 0.1 mA/cm², 1 hour of pause is taken, and the battery is then discharged to a cut-off voltage of 3.0 V, an initial discharge capacity of 130 mAh/g or more and preferably 135 mAh/g or more is obtained. It is also possible to decrease the resistance of positive electrode of such a 2032 type coin battery to 22 Ω or less and preferably 21 Ω or less.

(7) Application of Nonaqueous Electrolyte Secondary Battery

Such a nonaqueous electrolyte secondary battery has the characteristics as described above, and it can be thus suitably used as a power source for small portable electronic devices (laptop personal computers, cellular phone terminals, and the like) which always require a high capacity. In addition, this nonaqueous electrolyte secondary battery is also suitable as a power source for electric vehicle to be mounted in a restricted space since it can be miniaturized and have a high output.

Incidentally, this nonaqueous electrolyte secondary battery can be used not only as a power source for electric vehicle driven purely by electric energy but also as a power source for a so-called hybrid vehicle to be concurrently used with a combustion engine such as a gasoline engine or a diesel engine.

EXAMPLES

Hereinafter, the present invention will be described more specifically with reference to Examples, but the present invention is not limited to the following Examples at all.

Example 1

[Fabrication of Complex Hydroxide and Fabrication of Complex Oxide]

First, as presented in the following Table 1, manganese sulfate and nickel sulfate were dissolved in pure water so that the molar ratio of Mn and Ni was 1.50:0.50, and the total concentration of Mn and Ni was adjusted to be 1.9 mol %/L, thereby obtaining a mixed aqueous solution. Next, sodium carbonate was added to and mixed with a sodium hydroxide solution so that the proportion of the number of moles of sodium derived from sodium carbonate to the number of moles of entire sodium was 15%, thereby obtaining an alkali mixed aqueous solution.

Next, pure water was put in a 5 L reaction tank, the temperature was set at 40° C., and nitrogen was introduced into the reaction tank so that the oxygen concentration was 0.1% or less. The alkali mixed aqueous solution and 25% ammonia water were added into this reaction tank in proper amounts, and the pH in the reaction tank was adjusted to 12.0 at 25° C. and the concentration of ammonium ion was adjusted to 10 g/L, thereby obtaining an aqueous solution before reaction. The mixed aqueous solution containing manganese and nickel was added to the aqueous solution before reaction thus obtained in a proper amount by using a pump, and nucleation of manganese-nickel complex hydroxide was conducted. Incidentally, at this time, the reaction solution in the reaction tank was appropriately sampled and the pH and concentration of ammonium ion therein were measured so as to be maintained constant.

When the nucleation of manganese-nickel complex hydroxide was terminated, the supply of the alkali mixed aqueous solution was terminated, and at the same time, the pH in the reaction tank was adjusted with sulfuric acid to 11.0 at 25° C. In this state, the mixed aqueous solution, the alkali mixed aqueous solution, and 25% ammonia water were each supplied to the reaction tank again by using pumps. After the mixed aqueous solution and the like were supplied in corresponding amounts, pumping of the respective solutions was stopped and terminated. Incidentally, during supply of these aqueous solutions, the reaction solution in the reaction tank was appropriately sampled and the pH and concentration of ammonium ion therein were measured so as to be maintained constant.

Next, the manganese-nickel complex hydroxide thus obtained was filtered and dried to obtain a powder. Incidentally, chemical analysis was conducted by inductively coupled plasma (ICP) atomic emission spectrophotometry (725ES, manufactured by VARIAN Inc.) in order to confirm the composition of the manganese-nickel complex hydroxide. The results are presented in the following Table 2.

Lithium carbonate weighed was added to the complex hydroxide thus obtained so that the Li/Me ratio (incidentally, in the present Example, Me=Mn+Ni) was 0.50 and mixed with the complex hydroxide by using Turbula Shaker Mixer (T2F, manufactured by Dalton Co., Ltd.) to obtain a mixture (lithium mixture) of the manganese-nickel complex hydroxide and lithium carbonate.

Next, the lithium mixture thus obtained was calcined at 900° C. for 12 hours in the air atmosphere by using an atmosphere kiln (HAF-20205, manufactured by HIRO-CHIKU CO., LTD.). The calcined product thus obtained was pulverized and then held at 700° C. for 36 hours in the atmosphere kiln again for recalcination, thereby obtaining lithium-manganese-nickel complex oxide.

Incidentally, the composition ratio of the respective components in the lithium-manganese-nickel complex oxide thus obtained was determined through chemical analysis by ICP atomic emission spectrophotometry. In addition, the evaluation on the BET specific surface area was conducted by using a tapping·powder decrease type closely packed bulk density measuring instrument (model: TPM-1P, manufactured by TSUTSUI SCIENTIFIC INSTRUMENTS CO., LTD.). In addition, the presence or absence of sphericity was observed by using a scanning electron microscope (SEM) (JSM-7001F, manufactured by JEOL Ltd.). The results of the respective evaluations are presented in the following Table 2.

[Fabrication of Secondary Battery]

Figure 8:
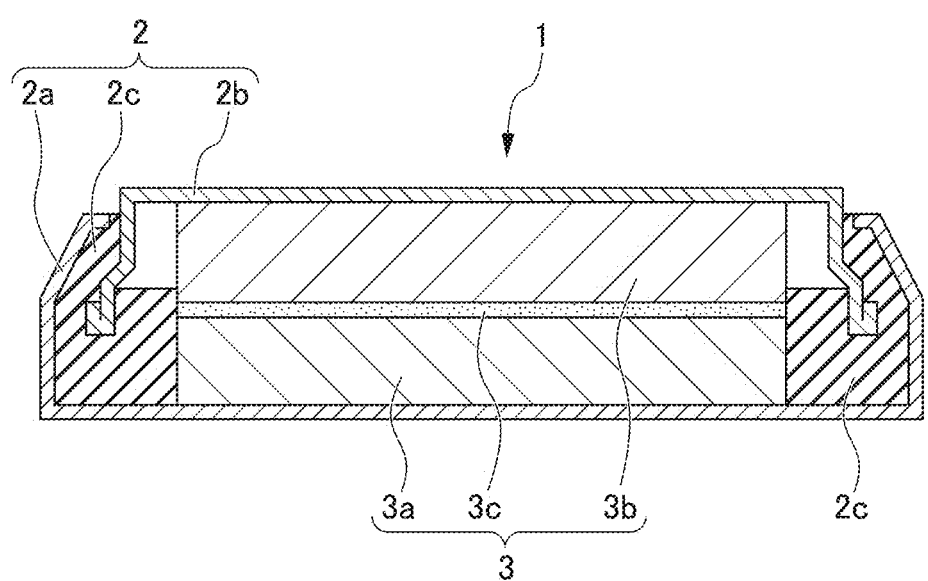
FIG. 8 is a schematic cross-sectional view of a 2032 type coin battery.

For evaluation of the lithium-manganese-nickel complex oxide thus obtained as a positive electrode active material, a 2032 type coin battery 1 (hereinafter referred to as the "coin type battery") was fabricated. Incidentally, the structure of the coin type battery will be described with reference to the schematic configuration view of FIG. 8.

The coin type battery 1 is composed of a case 2 and an electrode 3 accommodated in the case 2. The case 2 has a positive electrode can 2a which is hollow and open at one end and a negative electrode can 2b to be disposed at the opening of the positive electrode can 2a, and a space for accommodating the electrode 3 is formed between the negative electrode can 2b and the positive electrode can 2a when the negative electrode can 2b is disposed at the opening of the positive electrode can 2a. In addition, the electrode 3 is composed of a positive electrode 3a, a separator 3c, and a negative electrode 3b, and these are laminated so as to be aligned in this order, and the electrode 3 is accommodated in the case 2 so that the positive electrode 3a is in contact with the inner surface of the positive electrode can 2a and the negative electrode 3b is in contact with the inner surface of the negative electrode can 2b. Incidentally, the case 2 is provided with a gasket 2c, and the relative movement is fixed by the gasket 2c so that a noncontact state between the positive electrode can 2a and the negative electrode can 2b is maintained. In addition, the gasket 2c also has a function to seal the gap between the positive electrode can 2a and the negative electrode can 2b and to shield the space between the inside and the outside of the case 2 in an airtight and liquid-tight manner.

Such a coin type battery 1 was fabricated as follows.

First, 52.5 mg of the lithium-manganese-nickel complex oxide thus obtained, 15 mg of acetylene black, and 7.5 mg of polytetrafluoroethylene resin (PTFE) were mixed together, and the mixture was thinned until to have a weight of about 10 mg at a diameter of 10 mm, thereby fabricating the positive electrode 3a, and this was dried at 120° C. for 12 hours in a vacuum dryer.

Next, the coin type battery 1 was fabricated by using the positive electrode 3a in a glove box in an Ar atmosphere of which the dew point was controlled at −80° C. At this time, a lithium foil punched into a disk shape having a diameter of 14 mm or a negative electrode sheet obtained by coating a copper foil with a graphite powder having an average particle diameter of about 20 μm and polyvinylidene fluoride was used as the negative electrode 3b. In addition, a porous polyethylene film having a film thickness of 25 μm was used as the separator 3c and a 3:7 mixed solution (manufactured by TOMIYAMA PURE CHEMICAL INDUSTRIES, LTD.) of ethylene carbonate (EC) and diethyl carbonate (DEC) containing 1 M $LiPF_6$ as a supporting electrolyte was used as the electrolytic solution, respectively.

[Evaluation of Secondary Battery]

The performance of the coin type battery 1 was evaluated by measuring the discharge capacity and resistance of positive electrode of the battery as follows.

As the discharge capacity of positive electrode, the capacity when the battery was charged to a cut-off voltage of 5.0 V by setting the current density at 0.1 mA/cm$^2$, 1 hour of pause was taken, and the battery was then discharged to a cut-off voltage of 3.0 V was measured.

The resistance of positive electrode was evaluated by measuring DC-IR resistance. Specifically, the coin type battery 1 was charged to 60% of the initial discharge capacity, 1 minute of pause was taken, the battery was discharged for 10 seconds at a predetermined current density, 1 minute of pause was then taken again, and the battery was charged again for 10 seconds at a predetermined current density. This operation was conducted at the respective current densities of 0.4 mA/cm$^2$, 1.3 mA/cm$^2$, 4.0 mA/cm$^2$, and 6.6 mA/cm$^2$, and the differences between the respective voltages at the start of discharge and the respective voltages until the end of discharge were measured. Next, the respective measured values were plotted by taking the current density as the vertical axis and the voltage difference as the horizontal axis, the slope was determined by first-order linear approximation of the linear relationship thus obtained, and this slope was defined as the resistance of positive electrode (DC-IR resistance). These results are presented in Table 2.

Examples 2 to 8 and Comparative Examples 1 to 5

In Examples 2 to 8 and Comparative Examples 1 to 5, the molar ratio of the mixed aqueous solution, the presence or absence of the additional element, the molar ratio at that time, and the mixing ratio of the alkali mixed aqueous solution were changed as presented in the following Table 1. Manganese-nickel complex hydroxide and lithium-manganese-nickel complex oxide were synthesized, a secondary battery was fabricated, and various evaluations were conducted in the same manner as in Example 1 except this. The results are presented in Table 2.

Comparative Example 6 and Comparative Example 7

Manganese nitrate and nickel nitrate were used as the metal salts for preparing a mixed aqueous solution in Comparative Example 6 and manganese chloride and nickel chloride were used in Comparative Example 7. Manganese-nickel complex hydroxide and lithium-manganese-nickel complex oxide were synthesized, a secondary battery was fabricated, and various evaluations were conducted in the same manner as in Example 1 except this. The results are presented in Table 2.

TABLE 1

|  | Mixed aqueous solution [Molar ratio] | | | | Mixing ratio of sodium carbonate % [In terms of Na] |
|---|---|---|---|---|---|
|  | Mn | Ni | Additional element M | Metal salt |  |
| Example 1 | 1.5 | 0.5 | — | Sulfate salt | 5 |
| Example 2 | 1.5 | 0.5 | — | Sulfate salt | 2 |
| Example 3 | 1.5 | 0.5 | — | Sulfate salt | 10 |
| Example 4 | 1.5 | 0.5 | — | Sulfate salt | 18 |
| Example 5 | 1.5 | 0.45 | Fe: 0.05 | Sulfate salt | 5 |
| Example 6 | 1.45 | 0.5 | Ti: 0.05 | Sulfate salt | 5 |
| Example 7 | 1.48 | 0.49 | Al: 0.03 | Sulfate salt | 5 |
| Example 8 | 1.475 | 0.475 | Al: 0.05 | Sulfate salt | 5 |
| Comparative Example 1 | 1.5 | 0.5 | — | Sulfate salt | 0 |
| Comparative Example 2 | 1.5 | 0.5 | — | Sulfate salt | 22 |
| Comparative Example 3 | 1.5 | 0.5 | — | Sulfate salt | 30 |
| Comparative Example 4 | 1.5 | 0.45 | Fe: 0.05 | Sulfate salt | 0 |
| Comparative Example 5 | 1.475 | 0.475 | Al: 0.05 | Sulfate salt | 0 |
| Comparative Example 6 | 1.5 | 0.5 | — | Nitrate salt | 5 |
| Comparative Example 7 | 1.5 | 0.5 | — | Chloride salt | 5 |

TABLE 2

|  | Hydroxide | | | | Oxide | | Secondary battery | |
|---|---|---|---|---|---|---|---|---|
|  | Impurities [wt %] | | BET specific surface area [m$^2$/g] | $(d_{90} - d_{10})/$ Average particle diameter | Impurities [wt %] | | Discharge capacity [Ω] | Resistance of positive electrode [Ω] |
|  | SO$_4$ | Na |  |  | SO$_4$ | Na |  |  |
| Example 1 | 0.24 | <0.01 | 62.9 | 0.73 | 0.23 | <0.01 | 137 | 19 |
| Example 2 | 0.28 | <0.01 | 58.1 | 0.57 | 0.28 | <0.01 | 137 | 20 |
| Example 3 | 0.18 | 0.01 | 59.6 | 0.74 | 0.18 | 0.01 | 139 | 18 |
| Example 4 | 0.14 | 0.02 | 62.7 | 0.81 | 0.16 | 0.02 | 138 | 19 |
| Example 5 | 0.22 | <0.01 | 55.3 | 0.69 | 0.21 | <0.01 | 138 | 22 |
| Example 6 | 0.22 | <0.01 | 62.2 | 0.67 | 0.22 | <0.01 | 137 | 19 |
| Example 7 | 0.59 | <0.01 | 64.4 | 0.55 | 0.59 | <0.01 | 135 | 20 |
| Example 8 | 0.71 | <0.01 | 64.3 | 0.53 | 0.70 | <0.01 | 132 | 25 |
| Comparative Example 1 | 0.95 | 0.01 | 54.6 | 0.52 | 0.95 | <0.01 | 130 | 30 |
| Comparative Example 2 | 0.2 | 0.05 | 59.3 | 0.86 | 0.20 | 0.05 | 129 | 29 |
| Comparative Example 3 | 0.12 | 0.06 | 57.9 | 0.92 | 0.11 | 0.06 | 128 | 31 |
| Comparative Example 4 | 0.93 | <0.01 | 58.1 | 0.55 | 0.94 | <0.01 | 128 | 31 |

TABLE 2-continued

| | Hydroxide | | | | | Secondary battery | |
|---|---|---|---|---|---|---|---|
| | Impurities [wt %] | | BET specific surface area | $(d_{90} - d_{10})$/ Average particle | Oxide Impurities [wt %] | | Discharge capacity | Resistance of positive electrode |
| | $SO_4$ | Na | [m²/g] | diameter | $SO_4$ | Na | [Ω] | [Ω] |
| Comparative Example 5 | 1.8 | <0.01 | 53.9 | 0.59 | 1.80 | <0.01 | 125 | 39 |
| Comparative Example 6 | <0.01 | <0.01 | 52.5 | 1.15 | <0.01 | <0.01 | 127 | 34 |
| Comparative Example 7 | <0.01 | <0.01 | 24.4 | 0.53 | <0.01 | <0.01 | 129 | 30 |

EXPLANATION OF REFERENCE NUMERALS

1: Coin type battery
2: Case
2a: Positive electrode can
2b: Negative electrode can
3: Electrode
3a: Positive electrode
3b: Negative electrode
3c: Separator

The invention claimed is:

1. Manganese-nickel complex hydroxide represented by general formula (A): $Mn_{1-x-y}Ni_xM_y(OH)_{2+\alpha}$ ($0 \leq x \leq 0.27$, $0 \leq y \leq 0.05$, $0 \leq \alpha \leq 0.5$, and M is at least one element selected from among Mg, Al, Ca, Ba, Sr, Ti, V, Fe, Cr, Co, Cu, Zr, Nb, Mo, and W), wherein
a $SO_4$ content is 0.14% by weight or more and 0.90% by weight or less and a Na content is 0.04% by weight or less,
a BET specific surface area is 40 m²/g or more and 70 m²/g or less, and
a value which is an index indicating the expanse of particle size distribution and is determined by [$(d_{90} - d_{10})$/average particle diameter] is 0.90 or less.

2. The manganese-nickel complex hydroxide according to claim 1, wherein a $SO_4$ content is 0.60% by weight or less.

3. A method for manufacturing manganese-nickel complex hydroxide, the method comprising:
mixing a solution containing sulfate salts to be used as a manganese source and a nickel source and an alkali mixed aqueous solution which contains sodium hydroxide and sodium carbonate, is obtained by adding sodium carbonate to a sodium hydroxide solution so that a ratio of the number of moles of sodium derived from sodium carbonate to the number of moles of entire sodium is 20% or less, and is used as an alkali aqueous solution; and
depositing a hydroxide by reactive crystallization to obtain the manganese-nickel complex hydroxide according to claim 1.

4. Lithium-manganese-nickel complex oxide which is represented by general formula (B): $Li_tMn_{2(1-x-y)}Ni_{2x}M_{2y}O_4$ ($0.96 \leq t \leq 1.20$, $0.20 \leq x \leq 0.28$, $0 \leq y \leq 0.05$, and M is at least one element selected from among Mg, Al, Ca, Ba, Sr, Ti, V, Fe, Cr, Co, Cu, Zr, Nb, Mo, and W) and has a cubic crystal structure composed of a spinel structure, wherein
a $SO_4$ content is 0.16% by weight or more and 0.90% by weight or less and a Na content is 0.04% by weight or less.

5. The lithium-manganese-nickel complex oxide according to claim 4, wherein a $SO_4$ content is 0.60% by weight or less.

6. A nonaqueous electrolyte secondary battery comprising: a positive electrode, a negative electrode, a separator, and a nonaqueous electrolyte, wherein
a positive electrode material for the positive electrode contains the lithium-manganese-nickel complex oxide according to claim 4.

7. A method for manufacturing lithium-manganese-nickel complex oxide, the method comprising:
a step of mixing a solution containing sulfate salts as a manganese source and a nickel source and an alkali mixed aqueous solution which contains sodium hydroxide and sodium carbonate and is obtained by adding sodium carbonate to a sodium hydroxide solution so that a ratio of the number of moles of sodium derived from sodium carbonate to the number of moles of entire sodium is 20% or less and depositing manganese-nickel hydroxide by reactive crystallization; and
a step of mixing and calcining the manganese-nickel complex hydroxide obtained and a lithium compound to obtain the lithium-manganese-nickel complex oxide according to claim 4.

8. A method for manufacturing lithium-manganese-nickel complex oxide according to claim 4, the method comprising:
mixing and calcining manganese-nickel complex hydroxide and a lithium compound to obtain lithium-manganese-nickel complex oxide, wherein
the manganese-nickel complex hydroxide is represented by general formula (A): $Mn_{1-x-y}Ni_xM_y(OH)_{2+\alpha}$ ($0 \leq x \leq 0.27$, $0 \leq y \leq 0.05$, $0 \leq \alpha \leq 0.5$, and M is at least one element selected from among Mg, Al, Ca, Ba, Sr, Ti, V, Fe, Cr, Co, Cu, Zr, Nb, Mo, and W) and has
a $SO_4$ content of 0.14% by weight or more and 0.90% by weight or less and a Na content of 0.04% by weight or less,
a BET specific surface area of 40 m²/g or more and 70 m²/g or less, and
a value which is an index indicating the expanse of particle size distribution and is determined by [$(d_{90} - d_{10})$/average particle diameter] of 0.90 or less.

* * * * *